(12) United States Patent
Walter et al.

(10) Patent No.: US 12,548,339 B2
(45) Date of Patent: Feb. 10, 2026

(54) SYSTEM FOR VISUALLY MONITORING A WORKSPACE

(71) Applicant: Siemens Aktiengesellschaft, Munich (DE)

(72) Inventors: Maximilian Walter, Nuremberg (DE); Thomas Kahabka, Pommelsbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 43 days.

(21) Appl. No.: 18/596,766

(22) Filed: Mar. 6, 2024

(65) Prior Publication Data

US 2024/0303994 A1 Sep. 12, 2024

(30) Foreign Application Priority Data

Mar. 10, 2023 (EP) .................................. 23161238

(51) Int. Cl.
*G06V 20/52* (2022.01)
*G06T 7/70* (2017.01)
*G06V 10/25* (2022.01)

(52) U.S. Cl.
CPC .............. *G06V 20/52* (2022.01); *G06T 7/70* (2017.01); *G06V 10/25* (2022.01); *G06T 2207/20084* (2013.01)

(58) Field of Classification Search
CPC ........... G06V 20/52; G06V 10/25; G06T 7/70

USPC ........................................................ 348/143
See application file for complete search history.

(56) References Cited

U.S. PATENT DOCUMENTS

| | | | |
|---|---|---|---|
| 2009/0055205 A1* | 2/2009 | Nguyen | G07F 17/3241 348/169 |
| 2021/0012115 A1* | 1/2021 | Bodbyl | G06V 20/176 |
| 2021/0181708 A1* | 6/2021 | Chan | G08B 21/185 |

OTHER PUBLICATIONS

Li Hou et al. "Human Tracking Over Camera Networks: a Review", Eurasip Journal on Advances in Signal Processing, Biomed Central Ltd., London, UK, pp. 1-20, Jun. 5, 2017.

* cited by examiner

*Primary Examiner* — Nguyen T Truong
(74) *Attorney, Agent, or Firm* — Cozen O'Connor

(57) ABSTRACT

A system for visually monitoring a workspace that is preceded by an access zone configured such that it must first be passed through in order to reach an access point, wherein the access zone has an access zone detector that is similar in function to a workspace detector and is also formed with an imaging sensor for recording digital image files or point clouds and a test evaluation module that is configured to evaluate the image files or point clouds in the same way as provided in the evaluation module of the workspace detector and to output a position indication for a person detected in the access zone.

8 Claims, 5 Drawing Sheets

SYSTEM FOR VISUALLY MONITORING A WORKSPACE

BACKGROUND OF THE INVENTION

1. Field of the Invention

The invention relates to a system for visually monitoring a workspace into which at least one person can walk via an access point, comprising a workspace detector for the workspace that captures a monitoring zone within the workspace, where the workspace detector includes an imaging sensor for recording digital image files or point clouds and an evaluation module that is configured to evaluate the image files or point clouds and to output a position indication for a person detected in the monitoring zone.

2. Description of the Related Art

The use of an industrial robot in a workspace without a separating protective facility in the vicinity of people requires a suitable sensory environment capturing system for reliably detecting people and other objects, thereby enabling an appropriate reaction in the event of an imminent collision, where the industrial robot is switched off, for example. Industrial robots are usually controlled via fail-safe automation systems.

For the purposes of the invention, a fail-safe automation system should be understood to be an industrial controller certified in accordance with International Electrotechnical Commission (IEC) standard 62061 and thus configured as a controller designed for functional safety.

Fail-safe automation systems are used to control processes that can achieve a safe state immediately as the result of unexpected operating behavior or failure. These are fail-safe control processes with which an immediate shutdown to a safe state poses no danger to people or the environment. Fail-safe systems go beyond conventional safety engineering and activate far-reaching intelligent systems up to and including electrical drives and measuring systems. Fail-safe systems are used in applications with advanced safety requirements. Improved fault detection and localization in fail-safe systems based on detailed diagnostic information enable production to be resumed quickly following a safety-related interruption.

Conventional person detectors already achieve a very high level of quality. To ascertain the quality or the reliability of an individual channel, automated tests are performed before commissioning and these are an important part of safety argumentation. For this purpose, person detectors are presented with a large set of images of people, machines and other objects. The actual number, position and size of the people in this set of images is known in each case so that it is possible to automatically check whether the person detector has detected all the people, has not detected too many people or how accurate the detected positions are.

A known class of person detectors, and in particular person detectors based on artificial neural networks (ANNs), annotate each person detected with a real confidence value in the interval 0.0 to 1.0. A value close to 0 means that the person detector is not certain that it has actually detected a person. A value close to 1 means that the person detector is very certain that it has actually detected a person at this position.

The use of a confidence threshold (for example, 0.7) ensures that only results with a confidence above the threshold are reported. This reduces the number of false positive results (person reported who is not present at all). However, the threshold must not be set too high, as otherwise people who have actually been detected could be overlooked.

Hereinafter, it will be assumed that the threshold is ascertained experimentally based on test data such that all people actually present in the test data have a confidence level that is higher than the threshold by a safety value s.

Example: in the test, 1000 people with different confidence values are correctly identified. The minimum confidence value is 0.8. The threshold could then be set to 0.7, for example, and a safety value S would be 0.8-0.7=0.1. The problem with the above-described procedure is that, strictly speaking, this statement only applies to the set of test data. The results can only be transferred to practical use if the test data corresponds to the real data, or is at least very similar thereto. Therefore, an important prerequisite for an informative test is the careful selection of test data. If possible, this data must cover all cases that are relevant in practice.

This poses difficulties, in particular in the case of the detection of people, because ultimately, all people naturally have different external features (e.g., hair color, skin color, height, stature, and/or posture), and external features are also greatly influenced by clothing, hairstyle, and/or protective equipment. These features can be subject to fashion or other influences (for example, face masks during a pandemic).

Therefore, all test procedures known today have the flaw that they can never be complete. In addition, the assumptions made in the test can change retrospectively, thereby reducing the informative value of the test.

SUMMARY OF THE INVENTION

In view of the foregoing, it is accordingly and object of the invention to provide a system for visually monitoring a workspace that overcomes the above-described disadvantages.

This and other objects and advantages are achieved in accordance with the invention by a system for visually monitoring a workspace in which the workspace is preceded by an access zone, which is established such that it must be passed through in order to reach the access point, where the access zone has an access zone detector that is similar in function to the workspace detector and is also provided with an imaging sensor for recording digital image files or point clouds and with a test evaluation module that is configured to evaluate the image files or point clouds in the same way as provided in the evaluation module of the workspace detector and to output a position indication for a person detected in the access zone.

Furthermore, a reporting module is provided, which forwards the position indication for the person detected in the access zone to a safety controller that is configured to evaluate the reported position indication in the access zone as proof of a reliable later detection of the person in the workspace and is furthermore configured to generate a release signal for access to the workspace.

Accordingly, the invention proposes an online test in an airlock for people. Anyone wishing to enter the workspace must pass through this airlock. The airlock or the access zone contains one or more additional instances of AI-based person detectors. The door connecting the airlock with the workspace to be monitored is controlled by a safety controller, in particular a safety controller configured for functional safety.

The mode of operation of this airlock is as follows: a person entering the airlock is detected by the AI-based person detector. This AI-based person detector reports the position to the safety controller. This proves that the AI-based person detector can detect this particular person. Here, the safety controller releases the door. If the AI-based person detector cannot detect the person, then the door does not open. From this, the person can identify that the person detector is unable to detect them.

In contrast to previous solutions, the person detector is tested with every person who is to be localized by the person detector. The test advantageously occurs in a non-hazardous environment. Therefore, the "complete test of the safety function" required in the safety environment for person detectors is implemented from person to person. Unlike the case with a one-off test, such as that performed during commissioning, it is not possible for situations to arise in which specific features of a person are not taken into account in the test.

For further improvement, the access zone additionally contains a sensor for detecting the position of a person, which is configured to output an additional position indication for a person detected in the access zone and report it to the safety controller. The safety controller is furthermore configured to compare the reported additional position indication with the position indication of the access zone detector and only to generate the release signal if a deviation between the two position indications does not exceed a prespecifiable dimension.

The additional sensor enables the safety controller to check the accuracy of the position determination of the access zone detector and only to open the door if the position determination is good enough. One way to realize this feature is to use a plurality of light grids arranged vertically and parallel to one another. Alternatively, it would be possible to use laser scanners or safety mats as conventional sensors.

Detection reliability can be further increased if a marked point is arranged at a forced position in the access zone. Here, the safety controller is configured to check whether the position indication of the access zone detector matches the forced position during a prespecifiable waiting time and only then to generate the release signal. For example, the person has to wait 5 seconds at the marked position. The door only opens when the access zone detector reports a person at exactly this position for at least 5 seconds.

It is also possible, in addition to or instead of the marked position, for a track marked on the floor to be provided in the access zone. Here, the safety controller is furthermore configured to check whether the continuously recorded position indications of the access zone detector for the person match the position indications of the track and only then to generate the release signal. This alternative provides for the use of a track marked on the floor that the person must follow. The door will only open if the person follows this track accurately.

Safety can be further increased if a first dimension and a second dimension are stored in the safety controller and the first dimension describes a permissible deviation of the position indications in the access zone and the second dimension describes a permissible deviation of the position indications in the workspace. Here, the first dimension is selected to be greater than the second dimension, thereby ensuring that the only people allowed to enter the workspace are those for whom the more accurate check in the access zone also ensures sufficiently accurate detection of the position in the workspace. This now ensures that only people whose position can be "accurately" captured by the access zone detector enter the workspace.

The evaluation module for the detection of people and the test evaluation module are each formed with an artificial neural network.

An instance of the artificial neural network (ANN) trained and taught for the evaluation module in the workspace detector is used in the test evaluation module.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawings show an exemplary embodiment of the invention, in which.

DETAILED DESCRIPTION OF THE EXEMPLARY EMBODIMENTS

Figure 1:
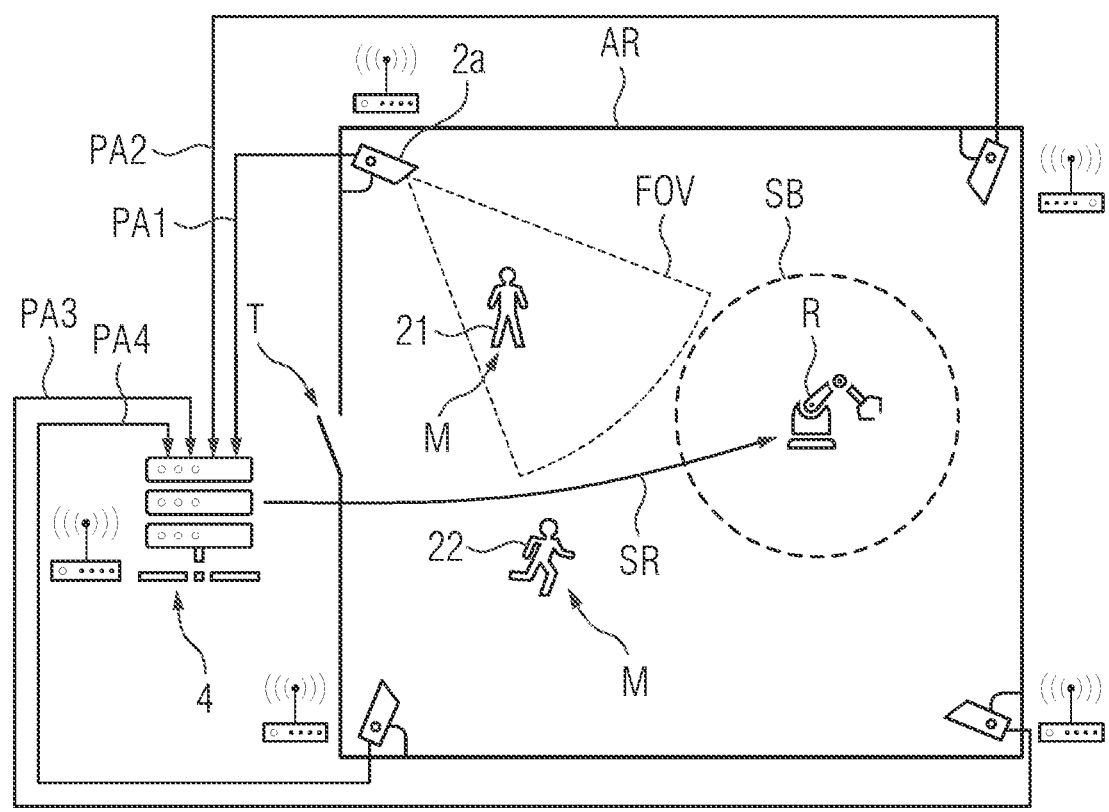
FIG. 1 is a schematic illustration of a system for monitoring a workspace in accordance with the prior art.

FIG. 1 depicts a system 1 for visually monitoring a workspace AR into which at least one person M can walk via an access point T.

The workspace AR is provided with workspace detectors 2a. The workspace detectors 2a can each send a first position indication PA1, a second position indication PA2, a third position indication PA3 and a fourth position indication PA4 to a safety controller 4. The safety controller 4 can in turn send a safe reaction to a robot R.

The robot R is located in a protection zone SB. If this protection zone SB is crossed by a person M, then the robot movement poses a risk to the person M.

The workspace detector 2a captures a monitoring zone FOV. A first person 21 and a second person 22 are standing in the workspace AR. The workspace AR can be entered via a door, namely the access point T.

Figure 2:
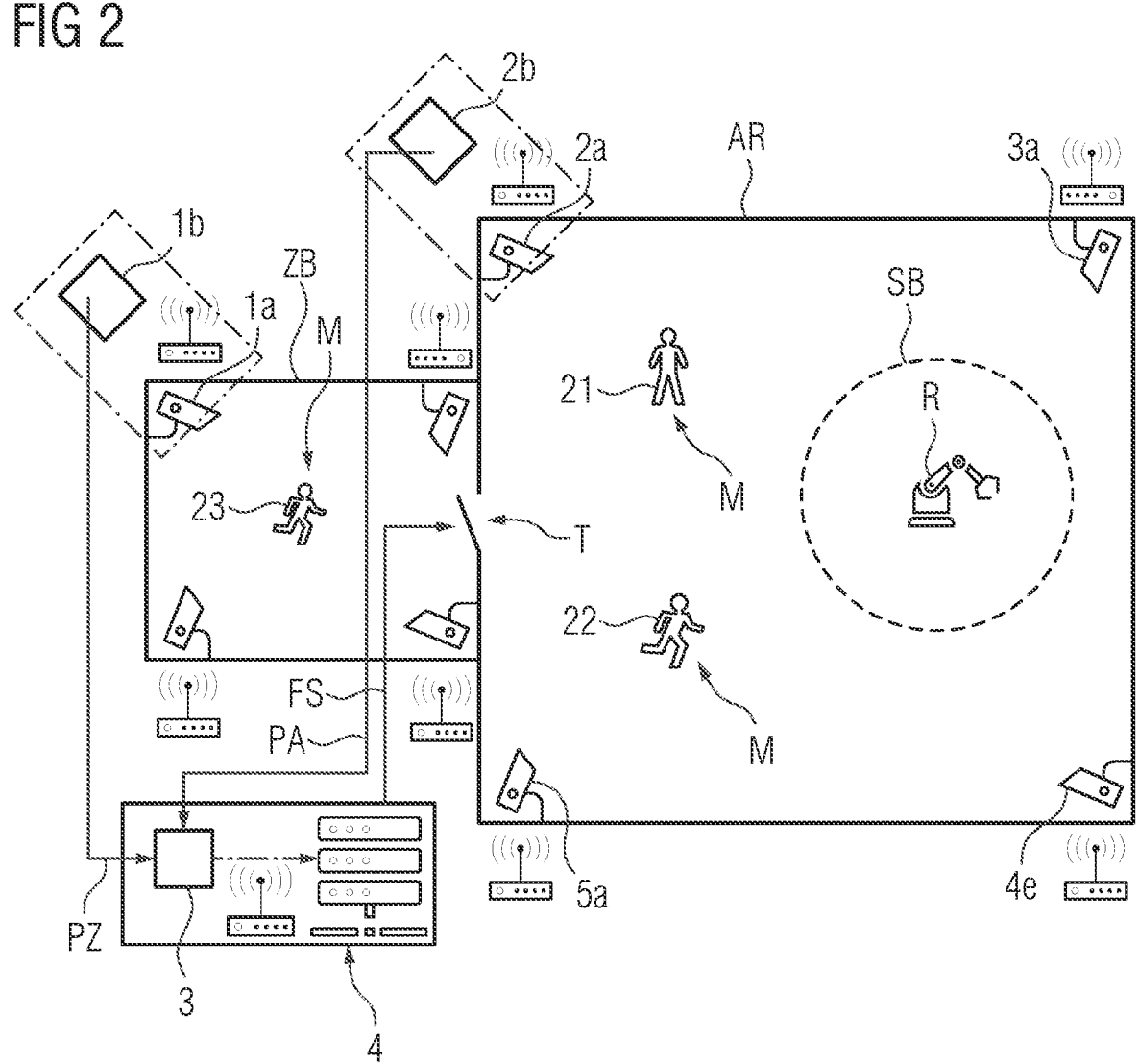
FIG. 2 is a schematic illustration of a system for monitoring a workspace that is preceded by an access zone in accordance with the invention.

FIG. 2 shows the extension in accordance with the invention for the workspace AR. The workspace AR is preceded by an access zone ZB that is established such that it must first be passed through in order to reach the access point T, where the access zone ZB has an access zone detector 1a, which is similar in function to the structure of the workspace detector 2a.

The workspace detector 2a is provided with an imaging sensor for recording digital image files or point clouds and with an evaluation module 2*b* that is configured to evaluate the image files or point clouds and to output a position indication PA for a person M detected in the monitoring zone FOV.

Due to the similar embodiment of the access zone detector, the access zone ZB with its access zone detector 1*a* can now also output a position indication PZ in the access zone ZB for a person M detected in the access zone 1*a*.

A third person 23 passes through the access zone ZB, where the access zone detector 1*a* sends the position indication PZ to a reporting module 3. The reporting module 3 is configured to forward the position indication PZ for the person M detected in the access zone ZB to the safety controller 4. The safety controller 4 is configured to evaluate the reported position indication PZ in the access zone ZB as proof of a reliable later detection of the person M in the workspace AR and is furthermore configured to generate a release signal FS for the access point T to the workspace AR.

Figure 3:
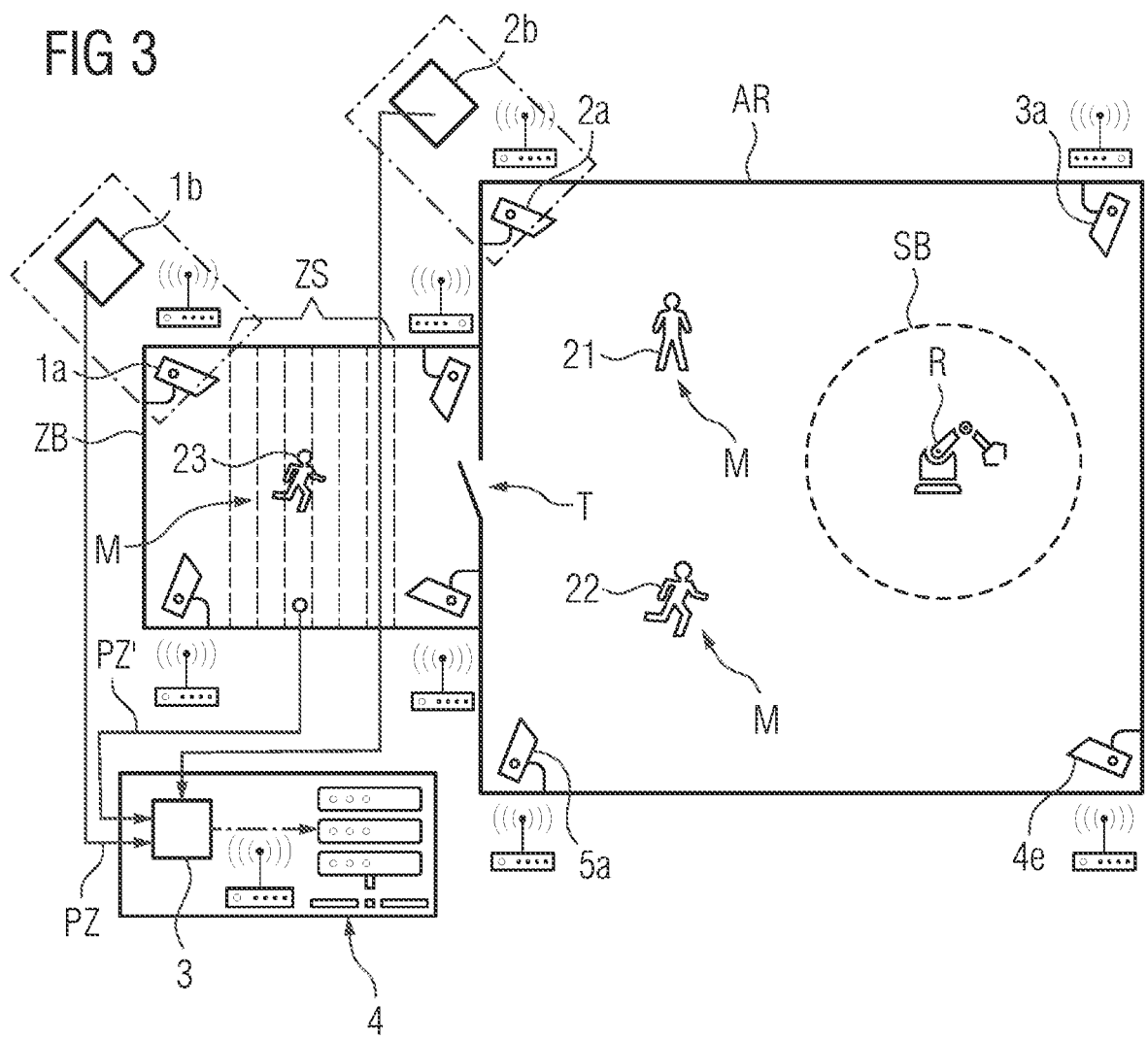
FIG. 3 is a schematic illustration of the monitoring system known of FIG. 2 with an additional sensor in the access zone.

FIG. 3 shows an addition made to FIG. 2 in the access zone ZB. Here, a sensor ZS for detecting the position of a person M is additionally provided in the access zone ZB. The additional sensor ZS is configured to output an additional position indication PZ' for a person M detected in the access zone ZB and report it to the safety controller 4. The safety controller 4 is furthermore configured to compare the reported position indication PZ' with the position indication PZ of the access zone detector 1*a* and only to generate the release signal FS if a deviation between the two position indications PZ,PZ' does not exceed a prespecifiable dimension d.

This embodiment of the safety controller 4 enables the safety controller 4 to check the accuracy of the position determination of a person detector, in particular a person detector based on an artificial intelligence system or on artificial neural networks and only to open the door or the access point T door if this position determination is good enough. The additional sensor ZS is embodied as a light grid with light beams arranged parallel to one another.

Figure 4:
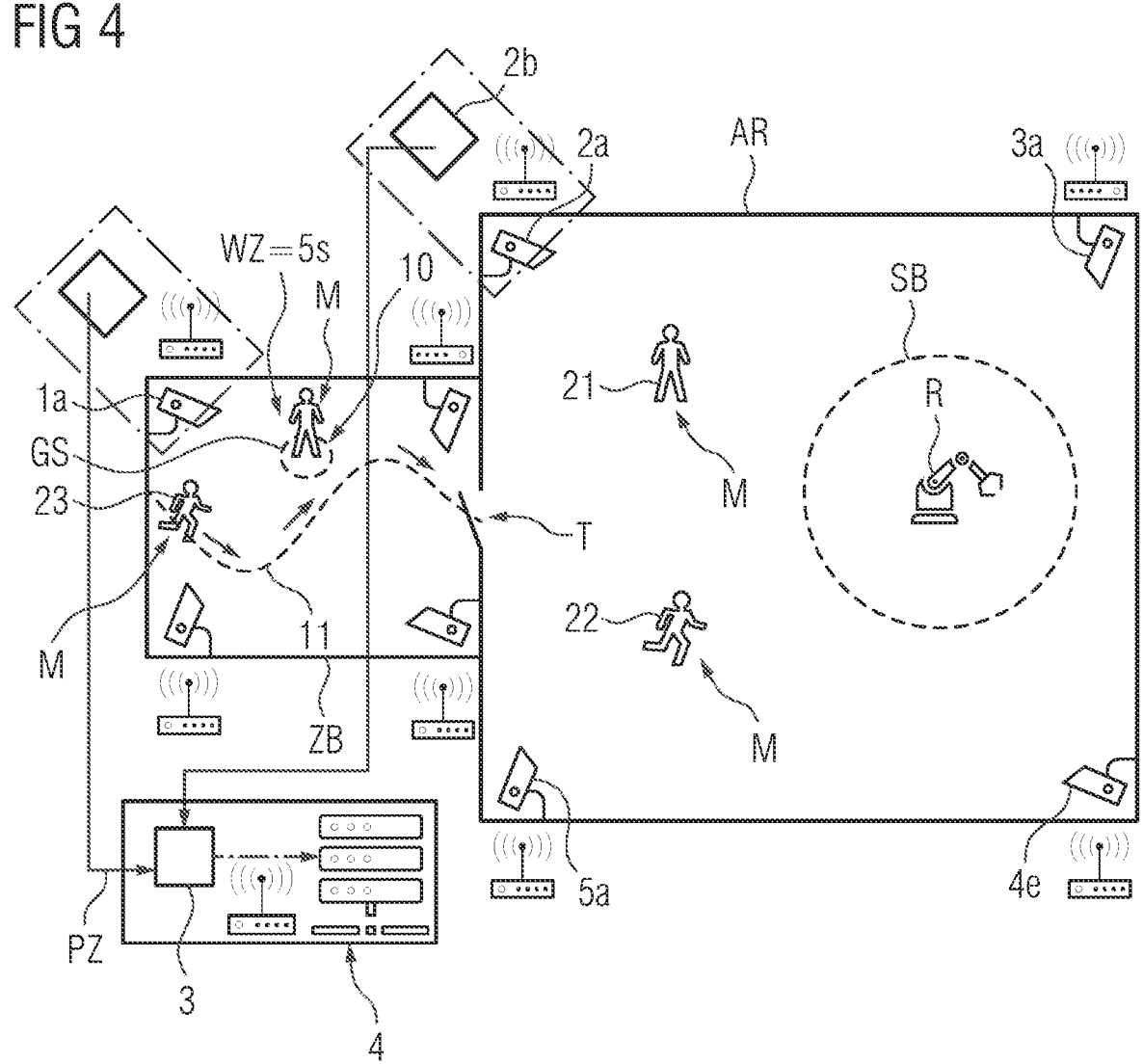
FIG. 4 is a schematic illustration of an embodiment of the invention with a marked position or a track in the access zone.

FIG. 4 additionally provides a marked point GS at a forced position 10 in the access zone ZB. The safety controller 4 is furthermore configured to check whether the position indication PZ of the access zone detector 1*a* matches the forced position 10 during a prespecified waiting time WZ and only then to generate the release signal FS. The person M has to wait at the marked position GS for 5 seconds, for example. The door only opens when the access zone detector 1*a* reports a person M at exactly this position, i.e., the forced position 10, for at least 5 seconds.

FIG. 4 shows that it is possible, in addition to or instead of the marked position GS, for a track 11 marked on the floor to be provided in the access zone ZB. Here, the safety controller 4 is configured to check whether the continuously recorded position indication PZ of the access zone detector 1*a* for the person M matches the position indications of the track 11 and only then to generate the release signal FS. This means the track 11 marked on the floor must be followed exactly by the person M otherwise the door will not be opened.

Figure 5:
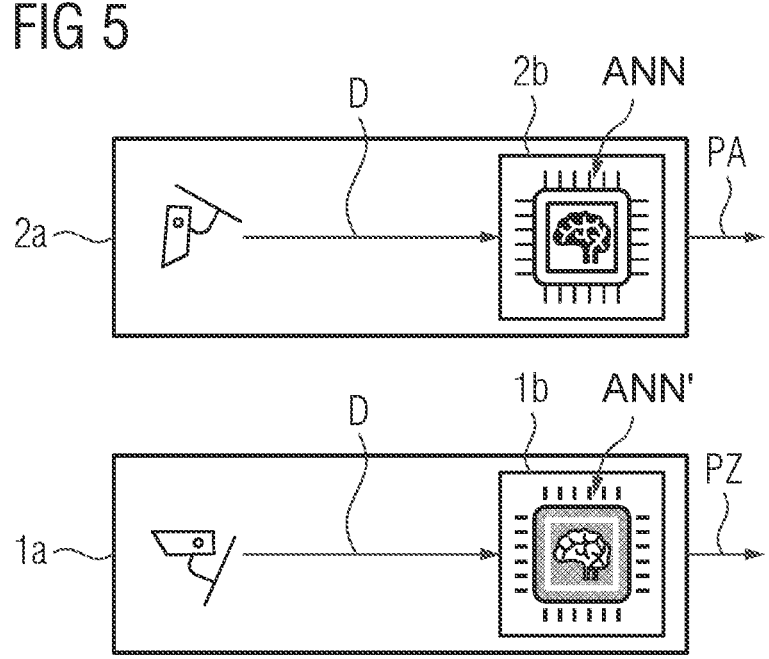
FIG. 5 is a schematic illustration of an access zone detector and a workspace detector in accordance with the invention.

FIG. 5 shows the access zone detector 1*a* and the workspace detector 2*a*. The workspace detector 2*a* is provided with an artificial neural network ANN. An imaging sensor for recording digital image files or point clouds sends the image data D to the artificial neural network ANN that generates a position indication PA therefrom. As a test evaluation module 1*b*, the access zone detector 1*a* has an instance ANN' of the artificial neural network ANN trained and taught for the evaluation module 2*b* in the workspace detector 2*a*.

Figure 6:
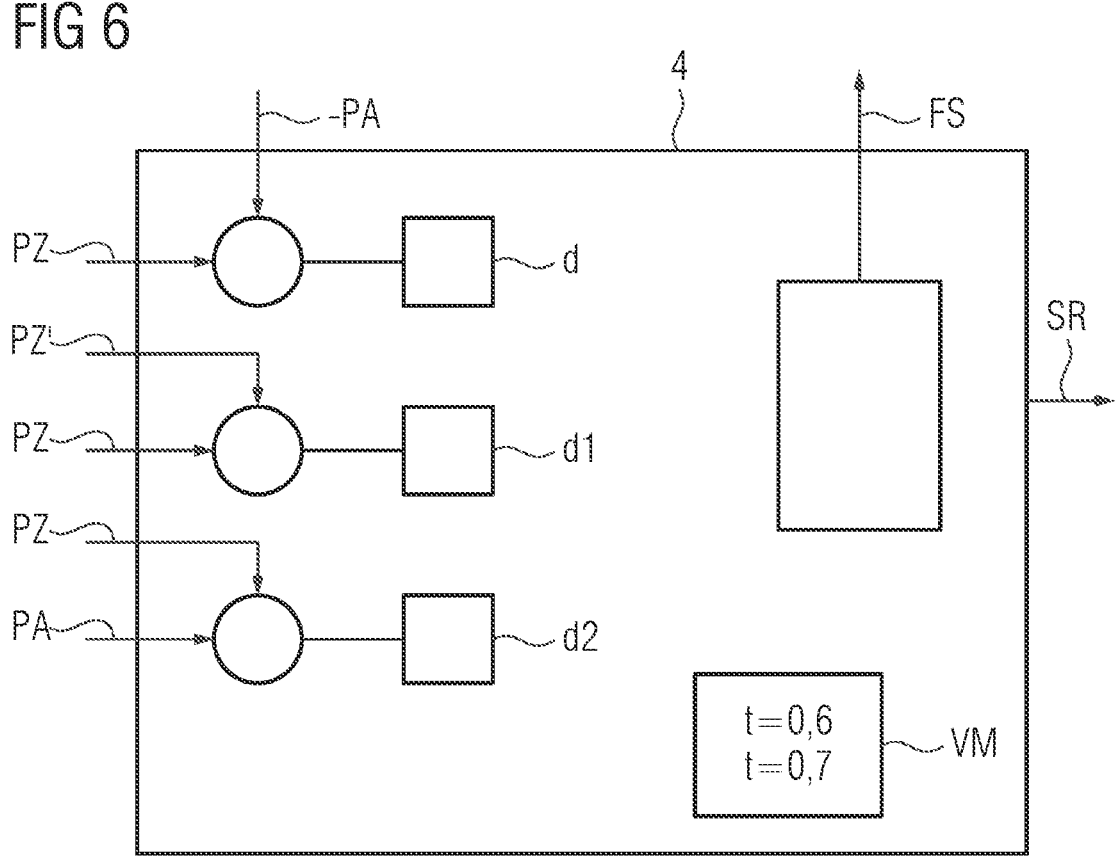
FIG. 6 is a schematic illustration of a safety controller in accordance with the invention.

FIG. 6 shows the safety controller 4, a first dimension d1 and a second dimension d2. The first dimension d1 is a permissible deviation of the position indications PZ, PZ' in the access zone ZB and the second dimension d2 is a permissible deviation of the position indications PZ, PZ' in the workspace AR. Here, the first dimension d1 is selected to be greater than the second dimension d2, thereby ensuring that the only people M allowed to enter the workspace AR are those for whom the more accurate check in the access zone ZB also ensures sufficiently accurate detection of the position in the workspace AR.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for visually monitoring a workspace into which at least one person can walk via an access point, comprising:
 a workspace detector for the workspace which captures a monitoring zone within the workspace, the workspace detector is including an imaging sensor for recording digital image files or point clouds and an evaluation module which is configured to evaluate the image files or point clouds and to output a position indication for a person detected in the monitoring zone;
 an access zone which precedes the workspace, said access zone being established such that passage through the access zone is necessary to reach the access point, the access zone including an access zone detector, which is similar in function to the workspace detector, and includes an further imaging sensor for recording digital image files or point clouds and a test evaluation module which is configured to evaluate the image files or point clouds in the same way as is provided in the evaluation module of the workspace detector and to output a position indication for when the person is detected in the access zone; and
 a reporting module which forwards the position indication for the person detected in the access zone to a safety controller which is configured to evaluate the reported position indication in the access zone as proof of a reliable later detection of the person in the workspace and further configured to generate a release signal for the access point to the workspace;
 wherein a sensor for detecting the position of a person is additionally present in the access zone and is configured to output an additional position indication when the person is detected in the access zone and report said additional position indication to the safety controller; and wherein the safety controller is furthermore configured to compare the reported additional position indication with the position indication of the access zone detector and to only generate the release signal if a deviation between the position indication and the additional position indication does not exceed a prespecifiable dimension.

2. The system as claimed in claim 1, wherein a marked point is arranged in the access zone at a forced position and the safety controller is furthermore configured to check whether the position indication of the access zone detector matches the forced position during a prespecifiable waiting time and only then to generate the release signal.

3. The system as claimed in claim 2, wherein, in addition to or instead of the marked position, a track marked on the floor is provided in the access zone and the safety controller is furthermore configured to check whether continuously recorded position indications of the access zone detector for the person match the position indications of the track and only then to generate the release signal.

4. The system as claimed in claim 1, wherein a first dimension and a second dimension are stored in the safety controller, the first dimension describes a permissible deviation of the position indication and the additional position indication in the access zone and the second dimension describes a permissible deviation of the position indication and the additional position indication in the workspace; and wherein the first dimension is selected to be greater than the second dimension, such that the only people allowed to enter the workspace are those for whom the more accurate check in the access zone also identifies a sufficiently accurate detection of the position in the workspace is ensured.

5. The system as claimed in claim 2, wherein a first dimension and a second dimension are stored in the safety controller, the first dimension describes a permissible deviation of the position indication and the additional position indication in the access zone and the second dimension describes a permissible deviation of the position indication and the additional position indication in the workspace; and wherein the first dimension is selected to be greater than the second dimension, such that the only people allowed to enter the workspace are those for whom the more accurate check in the access zone also identifies a sufficiently accurate detection of the position in the workspace is ensured.

6. The system as claimed in claim 1, wherein a first dimension and a second dimension are stored in the safety controller, the first dimension describes a permissible deviation of the position indication and the additional position indication in the access zone and the second dimension describes a permissible deviation of the position indication and the additional position indication in the workspace; and wherein the first dimension is selected to be greater than the second dimension, such that the only people allowed to enter the workspace are those for whom the more accurate check in the access zone also identifies a sufficiently accurate detection of the position in the workspace is ensured.

7. The system as claimed in claim 1, wherein the evaluation module for the detection of people and the test evaluation module each include an artificial neural network.

8. The system as claimed in claim 7, wherein an instance of the artificial neural network trained and taught for the evaluation module in the workspace detector is utilized in the test evaluation module.

* * * * *